(12) United States Patent
Trapy et al.

(10) Patent No.: US 7,166,218 B2
(45) Date of Patent: Jan. 23, 2007

(54) SEPARATION DEVICE COMPRISING A TUBULAR ELECTROCOALESCER

(75) Inventors: Jean Trapy, Rueil Malmaison (FR); Christine Noïk, Le Pecq (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 244 days.

(21) Appl. No.: 10/849,817

(22) Filed: May 21, 2004

(65) Prior Publication Data
US 2004/0232060 A1 Nov. 25, 2004

(30) Foreign Application Priority Data
May 23, 2003 (FR) .................................... 03 06189

(51) Int. Cl.
*B04B 5/10* (2006.01)
*B03C 5/02* (2006.01)
*B01D 17/038* (2006.01)

(52) U.S. Cl. .................... 210/512.1; 210/243; 210/748; 210/788; 204/554; 204/660; 204/670; 204/671

(58) Field of Classification Search ................ 210/243, 210/512.1, 748, 788, 806; 204/554, 660, 204/670, 671
See application file for complete search history.

(56) References Cited

U.S. PATENT DOCUMENTS

| 5,252,229 | A | 10/1993 | Rojey et al. ............... 210/787 |
| 5,565,078 | A | 10/1996 | Sams et al. ................ 204/671 |
| 5,647,981 | A | 7/1997 | Prevost et al. ............. 210/243 |
| 2002/0166820 | A1* | 11/2002 | Noik et al. ................. 210/748 |

FOREIGN PATENT DOCUMENTS

FR  2 824 489  5/2001

* cited by examiner

*Primary Examiner*—David A Reifsnyder
(74) *Attorney, Agent, or Firm*—Antonelli, Terry, Stout and Kraus, LLP.

(57) ABSTRACT

The present invention relates to a device for separating an effluent comprising phases of different density and conductivity, the device comprising a pair of electrodes (12, 13), means (10) for introducing the effluent between said electrodes, means intended for separation (3) and discharge (4) of said separated phases. The separation means comprise at least one centrifugation element including a helical channel (19) in which the effluent is centrifuged after passing between the electrodes. An opening extends over the entire periphery of said centrifuged effluent so as to discharge part of the centrifuged effluent. The discharge means further comprise sealing means for limiting discharge of the less dense phase through said opening.

12 Claims, 3 Drawing Sheets

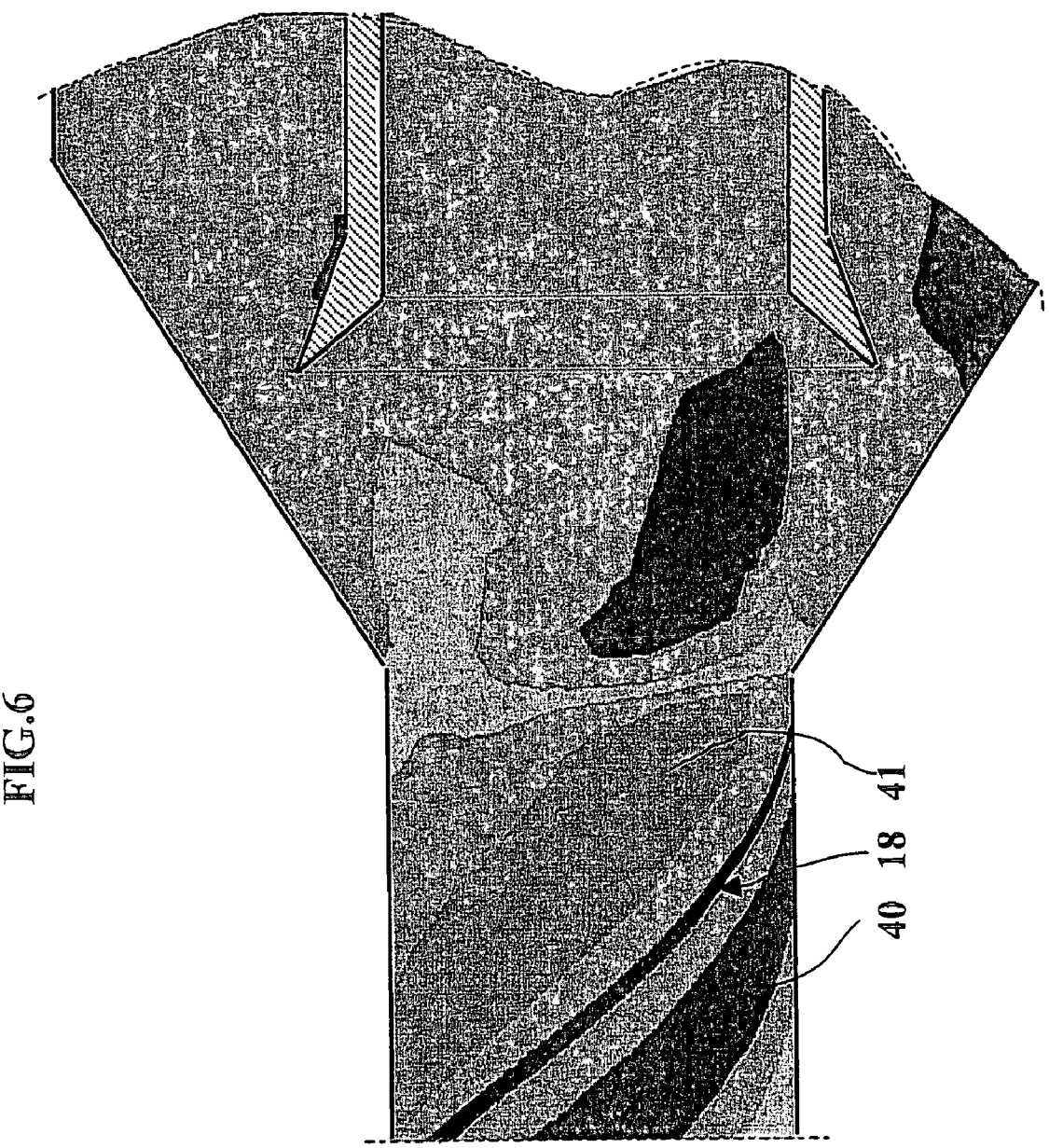
FIG.6
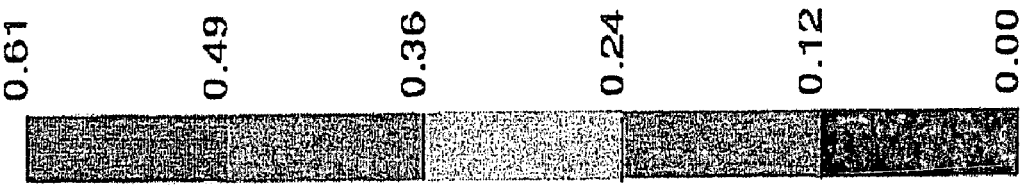

SEPARATION DEVICE COMPRISING A TUBULAR ELECTROCOALESCER

FIELD OF THE INVENTION

The present invention relates to the field of emulsified effluent processing, notably petroleum effluents from production wells. The emulsions concerned are those whose disperse phase is electrically conducting, unlike the continuous phase, for example water dispersed in an organic phase such as oil.

It is important to separate the water from the effluent produced so as to improve the quality, therefore the market value, of the effluent and to limit the size of the processing and transport equipments. After passage of the emulsified effluent through conventional water/oil separators, the effluent still contains about 1 to 5% emulsified water in the oil. The goal of the present invention is to decrease these residual amounts of water and salts in order to meet the technical requirements of the downstream processes.

BACKGROUND OF THE INVENTION

Document U.S. Pat. No. 5,647,981 describes a device which combines the principle of an electrocoalescer with centrifugation.

Water-in-oil emulsions can be "broken" by coalescence of the water drops through the action of an electric field. However, in order to increase the efficiency of these electrostatic separators, one tries to increase the electric potential between the electrodes, with a real risk of appearance of breakdown phenomena between electrodes. On the other hand, considering the residence time required between the electrodes, the effluent flow rate that can be treated is low, unless an installation of disproportionate size is used.

Document FR-2,824,489 discloses a combination between an electrocoalescer of determined shape and centrifugation and separation means specific to said coalescer.

The present invention aims to improve the separation means described in document FR-2,824,489.

SUMMARY OF THE INVENTION

The present invention thus relates to a device for separating an effluent comprising phases of different density and conductivity. The device comprises a pair of electrodes, means for introducing the effluent between said electrodes, a helical channel in which said effluent is centrifuged, after passage between said electrodes, so that the phases are separated, and means intended for discharge of the separated phases. The discharge means comprise an opening extending over the periphery of said centrifuged effluent to discharge part of the centrifuged effluent. The device is characterized in that the discharge means further comprise sealing means for limiting discharge of the less dense phase through said opening.

The sealing means can comprise a mask closing said opening and leaving an orifice so that the denser phase distributed in the lower part of said channel is discharged through said orifice and the less dense phase distributed in the upper part of said channel is kept inside the discharge means by said mask.

The sealing means can comprise a surface converging towards the inside of the discharge means, so that part of the effluent discharged through said opening is collected by said surface and fed into the discharge means. This surface can be truncated-cone-shaped.

The orifice can extend over an angular portion ranging between 20° and 180°.

The helical channel can consist of at least one helical wall arranged in an annular space. The end of the helical wall coincides with an edge of the orifice. The orifice can also extend on either side of the end of said helical wall.

The helical wall is in contact with the internal tube but it can provide a clearance with the wall of the external tube.

The helical channel can consist of a helical tube.

The electrodes can have the shape of cylinders arranged along the same axis.

The section of flow of said helical channel can be so determined that the velocity of the effluent increases in relation to the velocity of the effluent in the vicinity of said electrodes.

According to the invention, the less dense phase can be discharged through an axial line.

According to the invention, the discharge means can comprise a cyclone and an axial orifice for discharge of at least part of the centrifuged phase.

BRIEF DESCRIPTION OF THE FIGURES

Other features and advantages of the present invention will be clear from reading the description hereafter of a non limitative example, with reference to the accompanying drawings wherein:

FIG. 6 shows the distribution of the oil and water phases at the separator outlet.

DETAILED DESCRIPTION

The general layout of an example of embodiment of a device according to the invention meets the following requirements:

the fluid is preferably fed under pressure between two cylindrical and concentric walls, the tangential inlet is not essential but preferably maintained, the electrocoalescer has a determined geometry allowing to obtain a sufficient residence time for the effluent. For example, its length can be about 1 m and the annular space is such that the residence time of the fluid is 10 seconds at a flow rate of 500 l/h. The distance between the cylinders is therefore 7.86 mm (radius difference between a 2-inch tube (50.8 mm) and a 1-inch tube (25.4 mm)), a centrifuge is arranged after the electrocoalescer, whose motive element is one or more helical surfaces arranged between two concentric cylinders over, for example, a length of 500 mm. For information, the distance between the cylinders has been reduced to 6.35 mm (radius difference between a 1.5-inch tube and a 1-inch tube) in order to increase the velocity of the fluid as it flows through the centrifuge, the centrifuge opens onto a separator proper. This part is essential and of delicate design in order to prevent the intense turbulence developed at the centrifuge outlet from dispersing the water droplets again.

Figure 1:
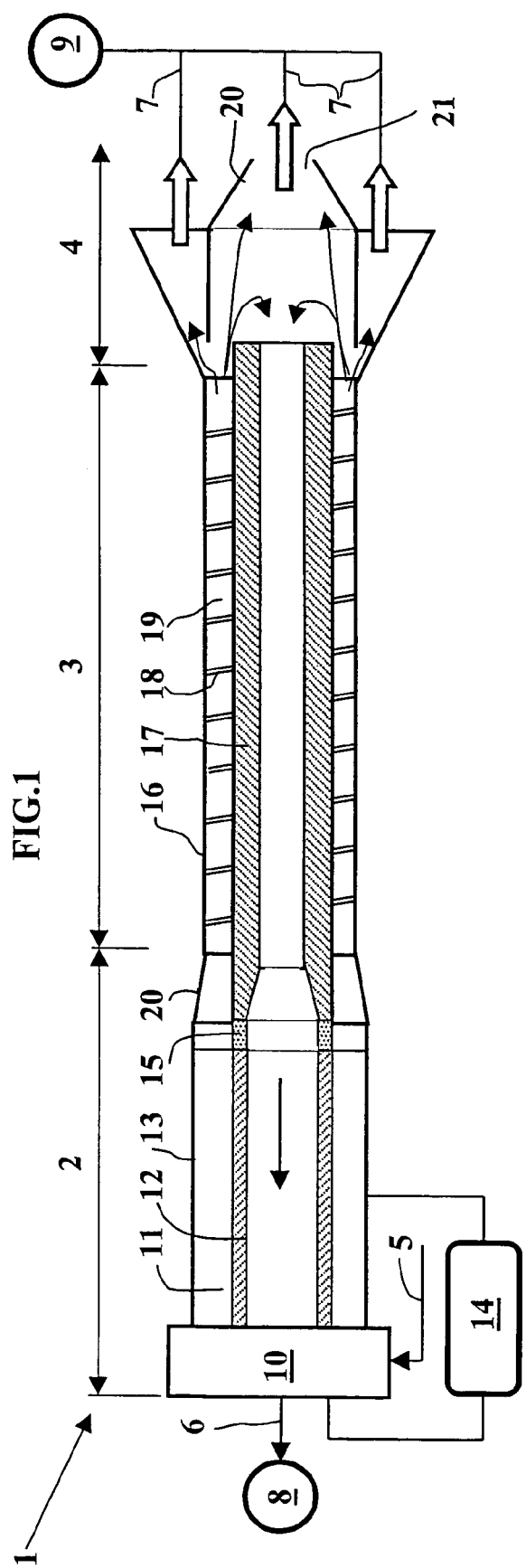
FIG. 1 diagrammatically shows the principle of the invention.

In FIG. 1, which shows the whole of device 1 according to the invention, reference numbers 2, 3 and 4 respectively refer to the coalescer, centrifuge and separator parts. Arrow 5 shows the inflow of the effluent containing the emulsion into the device, arrow 6 shows the outflow of the dehydrated effluent sent to transport and refining installations 8, arrows 7 show the various outflows of the essentially aqueous phase sent to discharge processing installations 9.

The means for feeding the emulsified effluent into the coalescer are such that the fluid is fed tangentially into annular space 11 delimited by the outside of electrode 12 and the inside of shell 13. The dimensions of the electrocoalescer, diametral and longitudinal, are so determined that, considering the rate of injection of the effluent through means 10, the residence time in the air gap of the electrodes is such that the coalescence of the water drops is optimum. Electrodes 12 and 13 are electrically connected to an electric field generator 14. Electrodes 12 and 13 are preferably cylindrical in shape. At the end of the coalescer, electric insulating means 15 separate the electrodes from the inlet means of centrifuge 3.

Centrifuge 3 consists of an external cylindrical tube 16, preferably vertical, an internal tube 17 in continuation with central electrode 12 of the coalescer, and a helical wall 18 in contact with the inside of tube 16 and the outside of tube 17 so as to form a continuous helical channel 19 around the longitudinal axis of the device. The shape of this channel 19 is such that the effluent at the coalescer outlet is led to be centrifuged over the total length of centrifuge 3. This length is furthermore determined to optimize the centrifuging effect. Conical connection means 20 can be used between the coalescer and the centrifuge in order to reduce the main section of flow of the effluent so as to increase the velocity of flow of the fluid in the centrifuge. The higher the velocity, the better the centrifugation and therefore the phase separation.

In an equivalent way, the centrifuge can be obtained from a line of suitable section with a helical shape for centrifugation of the fluid. At least one tube can for example be helically wound around a tube.

Without departing from the scope of the invention, centrifuge 3 can comprise several helical channels.

Figure 5:
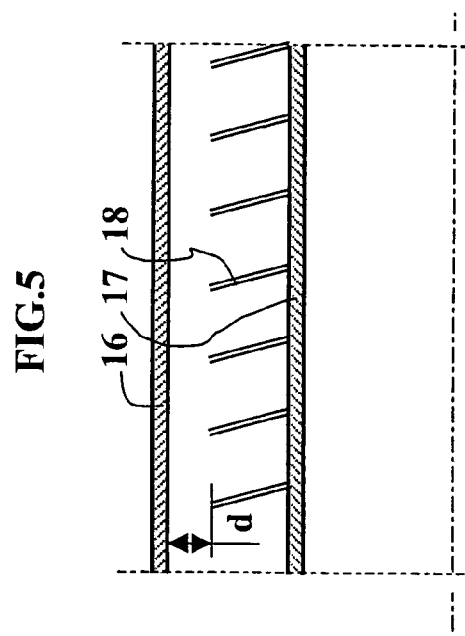
FIG. 5 illustrates a variant of the centrifuge.

FIG. 5 shows a variant of the centrifuge wherein helical wall 18 is not in contact with the inner wall of external tube 16. Clearance d allows formation of a layer of the centrifuged phase which can freely flow also in the longitudinal direction, i.e. downwards when the device is arranged vertically, which is generally preferable.

A separation element 4 is fastened to the end of the centrifuge. Its purpose is to collect the water drops which are in contact with the outer wall by centrifugation. A conical part 20 forming a continuation of the centrifuge produces a cyclone type separation, the centrifuged phase being discharged through orifice 21, the lighter phase (organic phase) being discharged in the direction of the axis of the cone through the inner space of tube 17 extended by the inner line of electrode 12. Separation element 4 furthermore comprises a lateral opening surface 22 allowing to separate the major part of the aqueous phase in contact with the inner wall of tube 16.

Figure 2:
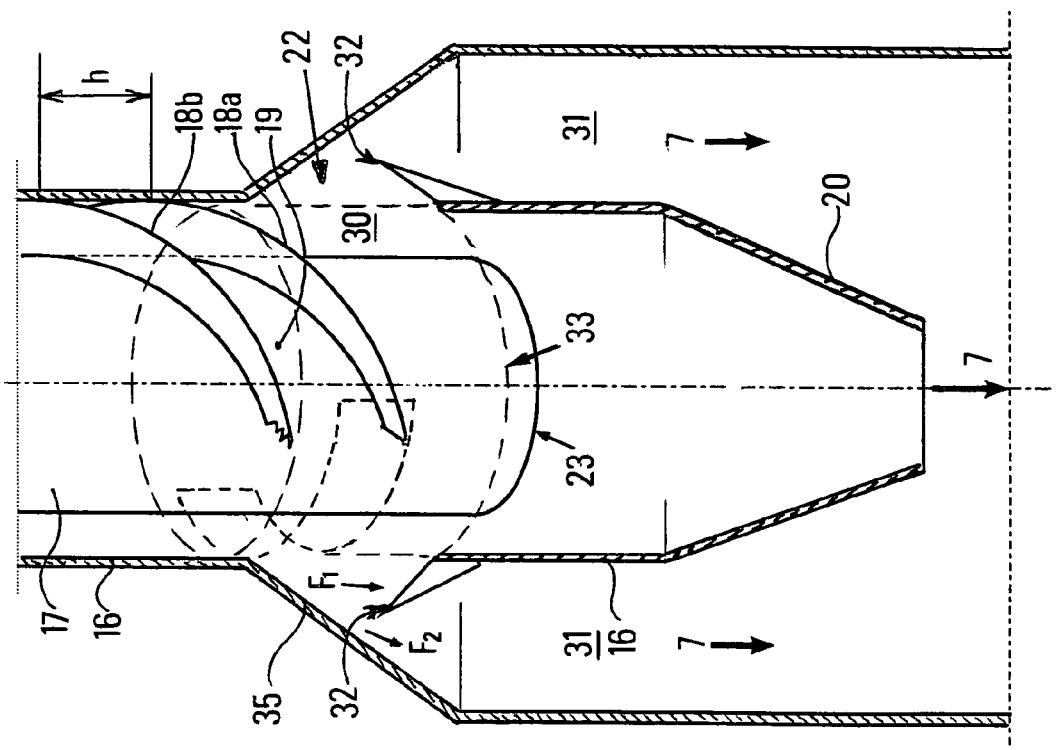
FIG. 2 diagrammatically shows the outlet of the separator according to the invention.

FIG. 2 shows more in detail the separation means. The same reference numbers as in FIG. 1 are used in FIG. 2. Channel 19 is delimited by two helical walls 18a and 18b separated by a distance h corresponding to the height of channel 19. At the end of centrifuge 3, channel 19 opens into an annular volume 30 defined between the inner surface of tube 16 and the outer surface of tube 17. Volume 30 communicates with collection volume 31 through opening 22 provided in tube 16. The collection volume is delimited by the outside of tube 16 and by divergent tube 35. It can be noted that end 23 of tube 17 is extended after opening 22. Opening 22 is preferably a complete ring extending over the periphery of tube 16 so that the major part of the centrifuged aqueous liquid is discharged through this opening. Opening 22 can be made by cutting out a portion of tube 16 between two planes. Thus, tube 16 is separated into two distinct sections: a section extending upstream from opening 22 and a section extending downstream from opening 22.

Figure 3:
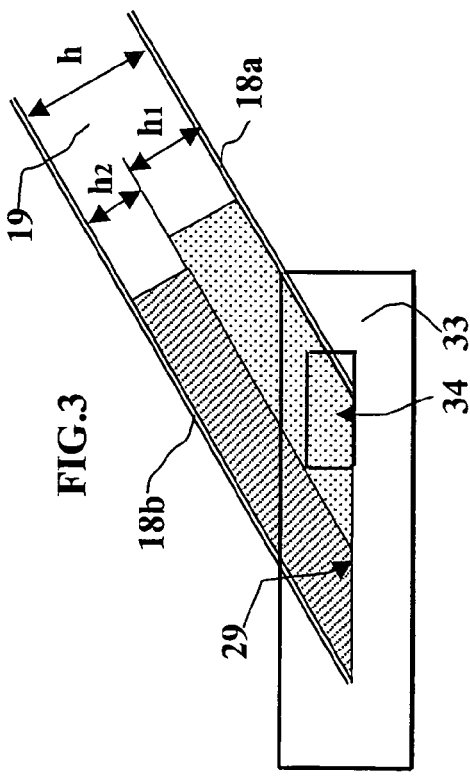
FIG. 3 is a developed view of a part of the invention.

Under the effect of centrifugation, the water, denser than oil, tends to spread and to circulate in the lower part of channel 19 whereas the oil tends to spread and to circulate in the upper part of channel 19. FIG. 3 shows channel 19 developed in a plane. The lower part of channel 19 rests on helical surface 18a. The upper part of channel 19 is delimited by helical surface 18b separated by height h from surface 18a. The phases of the effluent at end 29 of channel 19 are separated. The water represented by the dotted volume circulates in the lower part of channel 19 over height h1. The oil represented by the hatched volume circulates in the upper part of channel 19 over height h2.

FIG. 2 shows two means 32 and 33 intended to allow passage, through opening 22, mainly of aqueous liquid only and to keep the oil in volume 30.

First means 32 consists of a surface extending in volume 31, for example a truncated cone converging towards the inside of tube 16. Truncated cone 32 allows to collect part of the effluent that has passed through opening 22 and to feed it back into tube 16. Under the effect of centrifugation in channel 19, the oil phase that has flowed through opening 22 in the direction shown by arrow F1 is collected by truncated cone 32, then it is fed back into the inner volume of tube 16. The aqueous phase, denser than the oil phase, circulates mainly in the direction shown by arrow F2. The aqueous phase is not affected by truncated cone 32 and it is discharged from volume 31 through an outlet 7.

Figure 4:
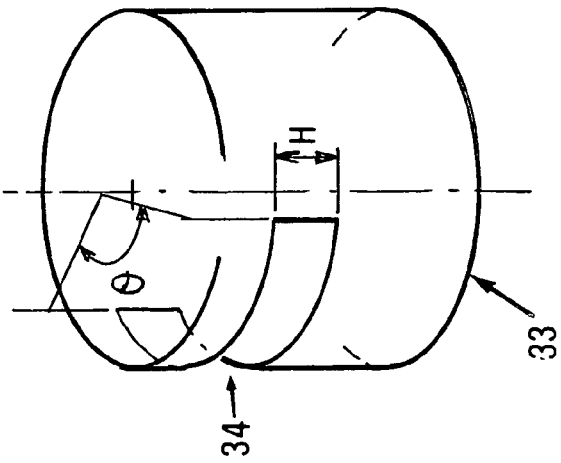
FIG. 4 shows in detail an element of the separator outlet.

Second means 33, shown in dotted line in FIG. 2 and in detail in FIG. 4, consists of a mask which closes part of opening 22. Mask 33 can be a tube portion inserted inside or outside tube 16. Mask 33 leaves an orifice 34. The position and the geometry of orifice 34 are so selected that the water circulating in the lower part of channel 19 is discharged through orifice 34 and the oil circulating in the upper part of channel 19 is kept in annular volume 30 by mask 33. For example, orifice 34 extends over an angular portion θ ranging between 20° and 180° and over a height H ranging between 10% and 100% of the height h of channel 19. Orifice 34 can be positioned in relation to the end of helical surface 18 marking the end of channel 19. For example, angular portion θ of orifice 34 is distributed on either side of the end of helical surface 18. Or the end of helical surface 18 coincides with an edge of orifice 34, orifice 34 extending over an angular portion θ from this edge in the direction of rotation of the helix of channel 19.

FIG. 3 also shows mask 33 developed in a plane. Orifice 34 is so positioned in relation to channel 19 that channel 19 mainly leads the aqueous phase to orifice 34.

One of the first and second means 32 and 33 can be used independently of the other. First and second means 32 and 33 can be used simultaneously.

Operation of the device according to the invention was simulated with the FLUENT fluid mechanics code. FIG. 6 shows the end of the separator. The numerical simulation results can be seen in FIG. 6: the distribution of the oil and of the water forming a petroleum effluent that circulates in the device according to the invention.

It can be observed in FIG. 6 that, on the one hand, the water 40 is distributed above surface 18 (i.e. in the lower part of channel 19) and, on the other hand, the oil 41 is distributed below surface 18 (i.e. in the upper part of channel 19).

Implementation of surface 32 or of mask 33 according to the invention allows to increase the value of the separated water fraction by about 25% in relation to the device provided with opening 22 without surface 32 and without mask 33.

The invention claimed is:

1. A device for separating an effluent comprising a denser phase and a less dense phase, said less dense phase having a density less than said denser phase and a conductivity different than said denser phase, said device comprising a pair of electrodes, means for introducing the effluent between said electrodes, a helical channel in which said effluent is centrifuged, after passage between said electrodes, so that the phases are separated and, a separation element intended for discharge of the separated phases, comprising an opening extending over a periphery of the effluent centrifuged in said helical channel to discharge a part of the effluent centrifuged in said helical channel, and a mask for limiting discharge of the less dense phase through said opening, said mask closing said opening and leaving an orifice extending over an angular portion ranging between 20° and 180° so that the denser phase distributed in a lower part of said helical channel is discharged through said orifice and the less dense phase distributed in an upper part of said helical channel is kept within an inside of said separation element by said mask.

2. A device as claimed in claim 1, said separation element further comprises a surface converging towards the inside of said separation element, so that part of the effluent discharged through said opening is collected by said surface and fed into said inside of said separation element.

3. A device as claimed in claim 2, wherein said surface is truncated-cone-shaped.

4. A device as claimed in claim 1, wherein said helical channel comprises at least one helical wall arranged in an annular space.

5. A device as claimed in claim 4, wherein an end of said wall coincides with an edge of said orifice.

6. A device as claimed in claim 4, wherein said orifice extends on either side of the end of said helical wall.

7. A device as claimed in claim 4, wherein said annular space is provided between an internal tube extending from one of said electrodes and an external tube extending from another of said electrodes, and said helical wall is in contact with said internal tube but provides a clearance (d) with the wall of said external tube.

8. A device as claimed in claim 4, wherein the less dense phase is discharged through an inner part of said internal tube.

9. A device as claimed in claim 1, wherein said helical channel comprises a helical tube.

10. A device as claimed in claim 1, wherein said electrodes have the shape of cylinders arranged along a common axis.

11. A device as claimed in claim 1, wherein a section of flow of said helical channel is so determined that the velocity of the effluent in said helical channel increases in relation to the velocity of the effluent in the vicinity of said electrodes.

12. A device as claimed in claim 1, wherein the separation element further comprises a cyclone and an axial orifice at a downstream end.

* * * * *